May 13, 1941.  R. K. HASKELL  2,241,401
BORE CENTER INDICATOR
Filed April 4, 1939  2 Sheets-Sheet 1
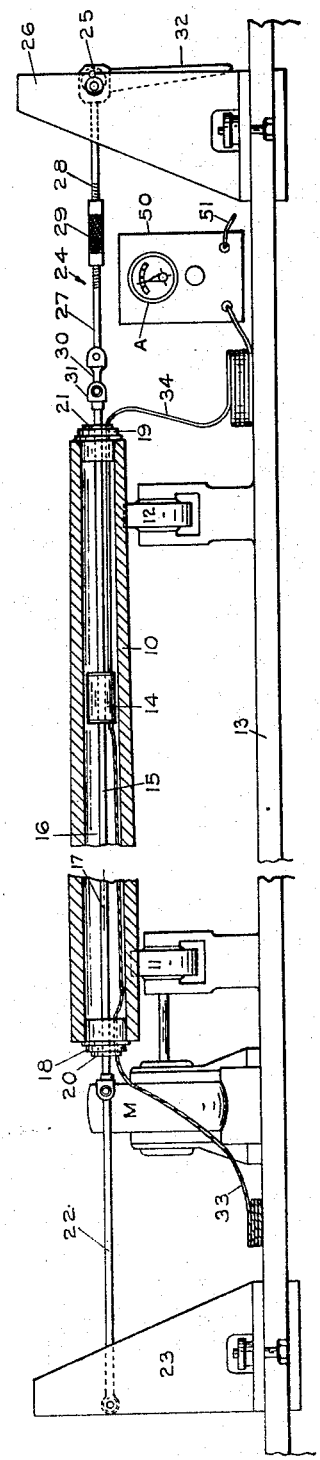
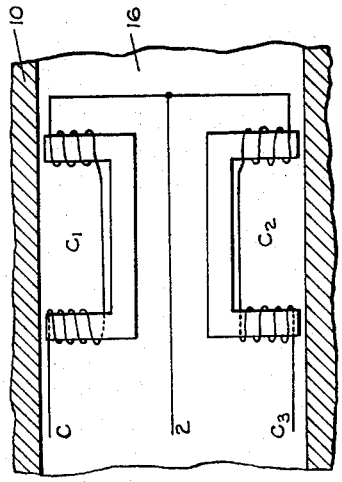
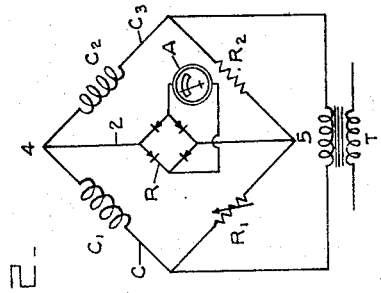
Inventor
Robert K. Haskell
By G. J. Kesserich a J. C. Sweed
Attorneys May 13, 1941.  R. K. HASKELL  2,241,401
BORE CENTER INDICATOR
Filed April 4, 1939  2 Sheets-Sheet 2

Inventor
Robert K. Haskell
By *Kessenich & McKnush*
Attorneys

Patented May 13, 1941

2,241,401

UNITED STATES PATENT OFFICE 2,241,401

BORE CENTER INDICATOR

Robert K. Haskell, United States Army, Berkeley, Calif.

Application April 4, 1939, Serial No. 265,996

6 Claims. (Cl. 33—174)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to a method and apparatus for detecting and measuring any eccentricities existing in a bore made through a magnetic substance.

More specifically this invention relates to a method and means adapted to indicate the amount and direction that any particular section or zone along the length of a bore in a tubular member of magnetic substance may deviate from being concentric with a reference axis established for the bore, as for example, the bore in a gun tube or similar tubular member.

It is an object of this invention to provide means for accurately determining the straightness of the bore made in a tubular member of magnetic substance that will not require physical contact between the surface defining the bore and the measuring instrumentality and that will not be dependent upon proper disposition of reference marks disposed in a field of view as required in optical systems employed for this purpose.

With this and other objects that will appear as the description proceeds the invention will now be described with reference to the accompanying drawings wherein:

Fig. 1 is a side elevation partially in section showing the bore center indicator of this invention in operative relation with respect to a gun tube.

Fig. 2 is a diagrammatic view illustrating the bridge circuit used in the bore center indicator of this invention.

Fig. 3 is a diagrammatic view of the electric head shown in Fig. 1.

Figure 4:
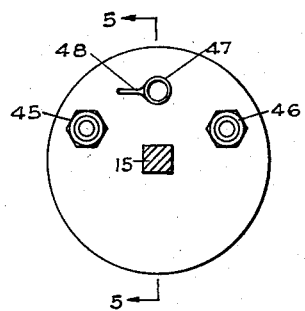
Fig. 4 is an end view of the electric head.

Referring now to Fig. 1, the gun tube 10 is shown supported for rotation about a longitudinal axis on rollers 11 and 12 mounted in any suitable machine 13. For the purpose of rotating the tube 10 the rollers 11 and/or 12 may be driven by any conventional means suited for the purpose such as the electric motor M. In order to support an electric head 14, to be hereinafter described in more detail, for movement along a reference axis 17 for the bore 16 of gun tube 10, a non-circular rod 15 is suitably located within the bore of the tube. The reference axis 17 is usually established through the centers of the holes at the opposite ends of the tube and may conveniently be established by bushings 18 and 19, respectively, inserted in the opposite ends of the tube and provided with openings 20 and 21, respectively, located at the centers of the holes of the tube. The rod 15 is arranged to have its extremities protrude from the bore through the openings in bushings 18 and 19 in such manner that its axis will coincide with the reference axis established. At one end rod 15 is connected by a suitable connecting link 22 to an anchor member 23 and at its opposite end it is connected by a suitable link 24 with an eccentric 25 mounted in an anchor member 26. To provide for adjustment of the connecting link 24 it may be comprised of sections 27 and 28 connected by a turnbuckle 29 and be connected with the rod 15 through a short link 30 and coupling 31. After the rod 15 has been connected with the anchor members 23 and 26 through the medium of the connecting links 22 and 24, respectively, and the turnbuckle 29 turned to remove any slack existing between section 28 of connecting link 24 and rod 15, the eccentric 25 may be rotated by its handle 32 to so tension rod 15 that it will not deflect from the established reference axis 17 due to its own weight and the imposed weight of electric head 14.

As shown in Fig. 1 the anchor members 23 and 26 are supported by machine 13, but it will of course be understood that these members may be supported in any suitable manner independent of the machine.

The electric head 14 is mounted on the rod 15 for sliding movement therealong which may be accomplished by the cable 33 and conductor cable 34. For the purpose of determining the position of the electric head along the length of the bore in tube 10 one or both of the cables 33 and 34 may be graduated in suitable units of length or a separate measuring tape or other measuring device may be employed for the purpose.

The electric head 14 is comprised of two inductance coils $C_1$ and $C_2$ having cores equispaced from its longitudinal axis 180 degrees relative to each other on a diameter slightly smaller than the diameter of the bore of the gun tube being checked for straightness of axis whereby an air gap will exist between the core of each coil and the adjacent surface of the tube defining the bore. By this arrangement it will be observed that if the section of the bore 16 within which the electric head 14 is located is concentric with the reference axis 17 established for the bore that the air gaps between the cores of the coils $C_1$ and $C_2$ and adjacent bore defining surfaces of tube 10 will remain constant as the tube is rotated about its reference axis. This condition of constant air gaps will in turn maintain the reluctances of the magnetic circuits through the cores, air gaps and tube 10 constant for a given current flowing in the coils. If, however, on the other hand the section of the bore within which the electric head 14 is positioned is eccentric with respect to the established reference axis for the bore, then the air gap between the core of coil $C_1$ and adjacent surface of the tube defining the bore will increase as the corresponding air gap for coil $C_2$ decreases, or vice versa, as the tube is rotated about its reference axis and these changes in the air gaps will change the reluctances of the magnetic circuits and hence the inductances of coils $C_1$ and $C_2$ accordingly. Inasmuch as the maximum and minimum radial distances from the reference axis 17 to the adjacent surface of the tube defining the bore, where the axis of the bore or that section of the bore being checked is eccentric with respect to the established reference axis, are generally on radial lines spaced 180 degrees from each other, it will further be observed that the coils $C_1$ and $C_2$ in being spaced 180 degrees from each other will indicate the position of the maximum and minimum radial lines when they have maximum and minimum inductances corresponding to the maximum and minimum air gaps between the cores of the coils and tube surfaces at these points and hence the full eccentricity of the bore at this portion of its length.

As shown in Fig. 3 the coils $C_1$ and $C_2$ are connected in series by the conductor $C$, $C_3$ and as shown in Fig. 2 the inductive circuit $C$—$C_1$—$C_2$—$C_3$ is connected in parallel with the non-inductance circuit $R_1$—$R_2$ in order to obtain the advantages of sensitivity inherent in a bridge circuit. The bridge circuit is energized with alternating current which may be taken from the secondary of a transformer T as indicated in Fig. 2 and the two branches of the bridge are interconnected by the conductor 2, copper-oxide or other suitable rectifier R and micro-ammeter A. It will now be seen that if the value of variable resistance $R_1$ is adjusted so that a potential difference exists between points 4 and 5 or so that the bridge is unbalanced, that any change in the inductances of coils $C_1$ and $C_2$ will increase or decrease the potential between points 4 and 5 as will be indicated by meter A. The changes in potential between points 4 and 5 can be calibrated against the change in inductances of coils $C_1$ and $C_2$, as affected by the change in the air gaps, to give direct readings of the amount of eccentricity of the bore with respect to the established axis 17.

Figure 5:
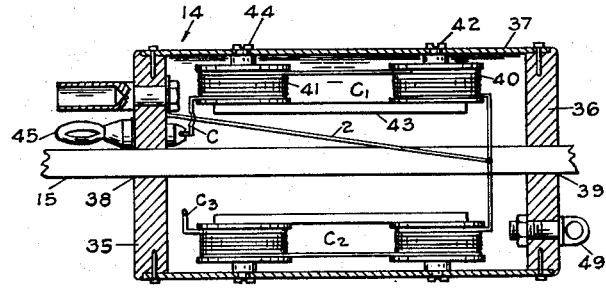
Fig. 5 is a section taken upon the line 5—5 of Fig. 4 in which the inductance coils are shown in elevation.

In practice the electric head 14 is made in the form of a cylindrical carrier having circular end members 35 and 36 joined by a tubular element 37. Preferably these parts are made of brass or other material of similar low magnetic permeability to eliminate or reduce magnetic coupling of coils $C_1$ and $C_2$. The circular end members 35 and 36 are provided with non-circular openings 38 and 39 so located in the members and of such shape relative to the cross section of rod 15 that the electric head 14 will be non-rotatably supported on rod 15 when the latter is inserted through openings 38 and 39 for sliding movement therealong with its longitudinal axis coinciding with the longitudinal axis of rod 15. Each of the coils $C_1$ and $C_2$ comprises a pair of inductances 40 and 41 connected in mutually aiding series relation and each inductance is provided with a soft iron core 42 or core of similar high permeability. The cores 42 of each pair of inductances 40 and 41 are joined in a well known manner by yokes 43 of a substance similar to the substance constituting the cores. The coils $C_1$ and $C_2$ are disposed within the tubular member 37 with their yokes 43 parallel to the axis of the head 14 and spaced equidistant from the axis on a diametral line of the head, with the cores 42 protruding slight equal distances from the tubular member 37 and secured thereto in any suitable manner indicated at 44. The circular end member 35 is provided with terminals 45, 46 and 47 and as shown in Fig. 5 the conductor C is connected with terminal 45, conductor $C_3$ with terminal 46 and conductor 2 with terminal 47. The terminal 47 is fashioned to provide an eyelet 48 or other suitable means for attaching a cable or rigid member for translating the electric head 14 along the bar 15 and the other circular end member 36 is provided with an equivalent device 49 for a similar purpose. The inductive branch of the bridge located in the electric head 14 is connected in parallel with the non-inductive branch of the bridge which may be suitably mounted on the control panel 50, by two conductors in the multiconductor cable 34 attached to the terminals 45 and 46 and proper arms of the non-inductive branch of the bridge, respectively. The conductor 2 of Fig. 2 comprises a third conductor of the multi-conductor cable 34 and is extended between the inductive branch of the bridge located in the electric head 14 and non-inductive branch of the bridge on the control panel 50 as diagrammatically indicated in Fig. 2. The bridge may be supplied with alternating current power from any suitable source such as T through conductors in the conductor cable 51.

Figure 6:
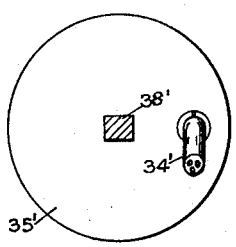
Fig. 6 is an end view of a modified form of electric head.
Figure 7:
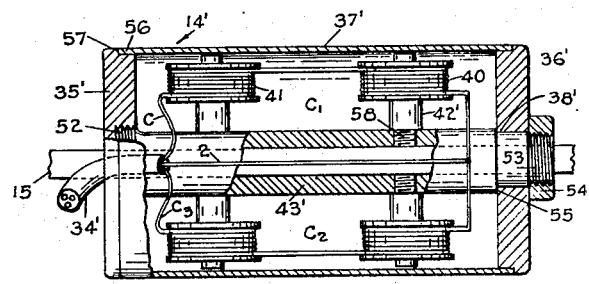
Fig. 7 is a partial sectional view of the form of electric head shown in Fig. 6.
Figure 9:
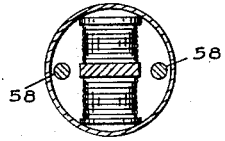
Fig. 9 is a cross section on the line 9—9 of Fig. 8.

In the modified form of electric head 14' shown in Figs. 6 and 7 a tubular member 37' is connected to two spaced apart circular end members 35' and 36' to form a cylindrical carrier for the electric head 14' very similar to the one shown in Fig. 5. In this instance, however, the members 35' and 36' are interconnected by an element 43' of circular section and axially bored to fit the bar 15 for non-rotatable sliding movement. The member 43' is disposed axially of the cylinder defined by the circular end members 35', 36' and tubular member 37' and may be secured to the member 35' by any conventional method of attachment such as the interthreaded engagement shown at 52 and secured to the member 36' by extending a reduced end portion 53 through an opening 38' in the member 36' in such manner that a nut or similar securing device 54 may be used to force and hold the end member 36' in abutting relation with the shoulder 55 on element 43' formed by the reduced end portion. An opening 38' is formed axially of member 35' of such size as will permit insertion of rod 15 through the bore of element 43'. Preferably the members 35', 36' and 37' are made of brass or similar low permeability substance and the members 35'—36' are peripherally grooved at 56 to receive the tubular member 37' in a manner to provide a flush fit between the tubular member and end members 35'—36'. The length of member 37' is so related to element 43' that when end circular member 36' is abutted against the shoulder 55 by means 54 the member 37' will abut the shoulders 57 on members 35'—36' formed by the grooves 56. The coils $C_1$ and $C_2$ may be of the same type as those shown in Fig. 5, but in this form of the electric head the cores 42' are disposed wholly within the head with their outer terminals spaced slight uniform distances from the inner surface of the member 37' and secured to member 43' by any suitable connection, such as the threaded connection shown at 58, with the cores of coil $C_1$ spaced on radial lines 180 degrees from the radial lines upon which the cores of coil $C_2$ are spaced. The conductors C—$C_3$—2 may be attached directly to corresponding conductors in cable 34', omitting the use of terminals as in the form of Fig. 5. Element 43' by this arrangement may serve as the yoke for all four cores 42' as well as a convenient means for holding the elements of the carrier in assembled relation and as a guide for the carrier on bar 15. The element 43' is of course made of a substance of high magnetic permeability.

Figure 8:
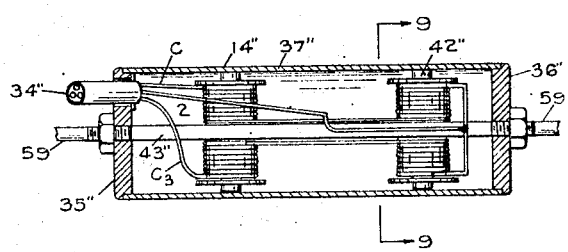
Fig. 8 is a longitudinal view of a further modified form of electric head partially in section and partially in elevation.

The form of head 14" as shown in Fig. 8 is intended for use in bores of relative small diameter and is comprised of a pair of axially spaced circular end members 35" and 36" joined by a tubular member 37" held in assembled relation by a bar 43" of rectangular cross section having reduced threaded projections at either terminal projecting through the end members 35" and 36" and suitable nuts or fastening means securing the members between the same and the ends of the bar 43". The bar 43" is of a substance of good magnetic permeability and disposed symmetrically about the axis of the carrier 14". Each of the end members 35"—36" is bored on a horizontal diameter equi distant from the axis of the carrier parallel to the axis as shown at 58 for the purpose of mounting the carrier on a pair of laterally spaced supporting wires or bars 59 adapted to be tensioned as in the case of bar 15 and disposed within the bore so that the head 14" will non-rotatably slide with its axis coinciding with the reference axis established for the bore. The coils $C_1$ and $C_2$ may have their cores 42" disposed as in the case of the head 14' of Fig. 7 and secured to the bar 43" which serves as a yoke for all the cores. Conductors C—$C_3$—2 may be connected to corresponding conductors in cable 34", and thereby suitably connected in the bridge circuit diagrammatically shown in Fig. 2 as in the case of the form of heads shown in Figs. 4 to 7.

When it is desired to test the straightness of the bore made in a gun tube or similar tubular member the bar 15 with the electric head 14 or 14' is inserted through the bore and the plugs 18 and 19 placed in position with the bar 15 protruding through the holes 20 and 21 in the plugs and cables 33 and 34 attached to the electric head and extending without the bore through suitable openings in the plug. The bar 15 is then tensioned by the connecting links 22, 24 and eccentric 25. The cable 34 is connected in on the control panel to form the bridge circuit shown diagrammatically in Fig. 2 and variable resistance $R_1$ so regulated that current flows between points 4 and 5 to deflect micro-ammeter A. The tubular member is now rotated about the reference axis 17 established by bar 15 through the motor M and support rollers 11 and 12. If the bore is not concentric with the reference axis 17 the inductances of coils $C_1$ and $C_2$ will be changed through change of the air gaps between the cores of the coil and surface of the tube defining the bore and such change in inductances will be reflected on the micro-ammeter in terms of eccentricity due to the change in current flow between points 4 and 5 effected by the change in the inductances of the coils. In using this type of straightness indicator the particular section of the bore showing eccentricity may be straightened by a press or other suitable means with the indicator in place in the bore. The indicator may be translated throughout the length of the bore on bar 15 whereby eccentricity at any section of the bore may be determined.

Where the bore is of small diameter the electric head 14" may be substituted for the head 14 or 14' and the supporting wires or rods 59 may be tensioned by means similar to the means shown in Fig. 1 or any other appropriate means for such purpose. In this case the rods or wires 59 are disposed within the bore on either side of the reference axis established for the bore equal distances so that the axis of the carrier 14" which lies midway between the axes of rods or wires 59 will be translated along the established reference axis.

I claim:

1. An electric head comprising a pair of opposed end members joined by a tubular member to provide an elongated carrier, said end members being provided with axially aligned openings to provide support therefor upon a bar inserted therethrough, a pair of coils connected in series and disposed within the carrier in opposed relation with their axes normal to the axis of the carrier and equally spaced therefrom, means comprising cores for the coils affixing the coils in operative position within the carrier and conductors connected with the coils adapted to connect the coils in a desired remote circuit.

2. An electric head comprising a pair of opposed end members joined by a tubular member to form a cylindrical carrier, said end members being axially bored to provide bearings for translatory movement of the carrier upon a support inserted through the carrier with its axis coinciding with the axis of the carrier, a plurality of cores disposed in symmetrical relation about the axis of the carrier and secured thereto with their outer terminals protruding equal distances without the tubular member, yokes joining the inner terminals of opposed cores of said plurality of cores in symmetrical relation with respect to the axis of the carrier, inductors connected in series and mounted upon said cores, and means adapted to connect said inductors in a desired circuit.

3. An electric head comprising a pair of opposed end members joined by a tubular member to form a carrier, said end members being secured in fixed relation to the tubular member by a second and smaller tubular member axially disposed of the carrier, a plurality of opposed cores disposed within the carrier and secured to said second tubular member with their outer ends terminating closely adjacent the interior surface of said first named tubular member, a plurality of inductors connected in series mounted on said cores and means adapted to connect said inductors in a desired circuit.

4. An electric head comprising a pair of opposed end members joined by a tubular member to form a carrier, said end members being secured in fixed relation to the tubular member by a bar axially disposed of the carrier, a plurality of opposed cores disposed within the carrier and secured to said bar with their outer ends terminating closely adjacent the interior surface of the tubular member, a plurality of inductors connected in series mounted on said cores, means adapted to connect said inductors in a desired circuit and means for translating the carrier with its axis coinciding with an established axis.

5. A bore center indicator for indicating variations in the axis of the bore of a bored element of magnetic substance with respect to a reference axis established for said bore comprising in combination, means providing a support disposed on said reference axis, a plurality of opposed inductances connected in series, means mounting the inductances on said support with their fields in linking relation with said element, means for relatively translating and rotating the inductances and element with respect to said support, means connecting said inductances in a bridge circuit, means connected across said bridge circuit for indicating eccentricity, and a circuit including a source of alternating current and said bridge circuit.

6. A method of determining the straightness of the axis of the bore of a tubular member comprising passing an alternating current through a reactance bridge circuit, relatively rotating and translating the reactance elements of the bridge with respect to the tubular member along a reference axis for the base of said member with said elements at a fixed distance from the reference axis and their fields disposed in linking relation with opposed portions of said member, and measuring variations of the axis of said member from straightness by indicating variations in the reactances impressed on said elements through variations in the air gaps between said member and elements.

ROBERT K. HASKELL.